US012304218B2

(12) United States Patent
Butinya Teixido et al.

(10) Patent No.: US 12,304,218 B2
(45) Date of Patent: May 20, 2025

(54) RECIRCULATION DEVICES WITH CHECK VALVE

(71) Applicant: Hewlett-Packard Development Company, L.P., Spring, TX (US)

(72) Inventors: David Butinya Teixido, Sant Cugat del Valles (ES); Dorkaitz Alain Vazquez Fernandez, Sant Cugat del Valles (ES); Josep Ortiz Mompel, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 112 days.

(21) Appl. No.: 17/995,721

(22) PCT Filed: Apr. 9, 2020

(86) PCT No.: PCT/US2020/027466
§ 371 (c)(1),
(2) Date: Oct. 7, 2022

(87) PCT Pub. No.: WO2021/206717
PCT Pub. Date: Oct. 14, 2021

(65) Prior Publication Data

US 2023/0136963 A1 May 4, 2023

(51) Int. Cl.
*B41J 2/18* (2006.01)
*B41J 2/175* (2006.01)

(52) U.S. Cl.
CPC ............. *B41J 2/18* (2013.01); *B41J 2/17596* (2013.01)

(58) Field of Classification Search
CPC . B41J 2/175; B41J 2/18; B41J 2/17596; B41J 2/04501; B41J 2/17566; B41J 2/17513
See application file for complete search history.

(56) References Cited

U.S. PATENT DOCUMENTS

| | | | | |
|---|---|---|---|---|
| 5,507,318 | A | 4/1996 | Israelson | |
| 6,752,493 | B2 | 6/2004 | Dowell et al. | |
| 8,002,395 | B2 | 8/2011 | Langford et al. | |
| 8,444,259 | B2 | 5/2013 | Bennett | |
| 8,474,930 | B2 | 7/2013 | Rasmussen | |
| 2009/0040249 | A1 | 2/2009 | Wouters et al. | |
| 2009/0141101 | A1 * | 6/2009 | Takagi ................ | B41J 2/17596 251/356 |
| 2012/0075390 | A1 | 3/2012 | Park et al. | |

FOREIGN PATENT DOCUMENTS

WO 2019/078845 A1 4/2019

* cited by examiner

*Primary Examiner* — Jannelle M Lebron
(74) *Attorney, Agent, or Firm* — Jordan IP Law, LLC

(57) ABSTRACT

Examples relate to a method to recirculate print agent in a printing system. The method comprises detecting a recirculation device comprising a check valve and detecting a printhead connected in parallel to the detected recirculation device. The method further comprises selecting a printhead circulation mode to circulate print agent through the detected printhead and selecting a recirculation device circulation mode to circulate print agent through the detected recirculation device.

16 Claims, 6 Drawing Sheets

RECIRCULATION DEVICES WITH CHECK VALVE

BACKGROUND

A printing system may include a pen or a printhead with a plurality of nozzles that deliver print agent onto a print medium so as to print an image. A print agent deliver system may supply print agent from a print agent tank to the printhead.

BRIEF DESCRIPTION OF THE DRAWINGS

Various example features will be apparent from the detailed description which follows, taken in conjunction with the accompanying drawings, wherein.

DETAILED DESCRIPTION

A printing system comprises a printhead which may deliver print agent onto a print medium, e.g. a paper sheet. The printhead may be provided with a plurality of nozzles to deliver print agent, e.g. ink, onto the print medium so as to print an image. The printhead may be mounted on a printhead support. During printing, dots of print agent may be precisely delivered onto the print medium at a specific printhead-to-print medium spacing or distance.

In some examples, the printhead support may comprise a carriage. The printhead may thus be mounted on a carriage for moving across a scan axis. The printhead may travel repeatedly across a scan axis for delivering print agent onto a print medium which may advance along an advancing axis. The scan axis may be substantially perpendicular to the advancing axis. In some examples, several printheads may be mounted on a carriage. In some examples, four printheads may be mounted on a single carriage. In some examples, eight printheads may be mounted on a single carriage.

In some examples, the printhead support may be static. The printhead may extend along a width of a print medium. The plurality of nozzles may be distributed within the printhead along the width of the print medium. The width of the print may be substantially perpendicular to an advancing axis of the print medium. Such an arrangement may allow most of the width of the print medium to be printed simultaneously. These printer systems may be called as page-wide array (PWA) printer systems.

Figure 1:
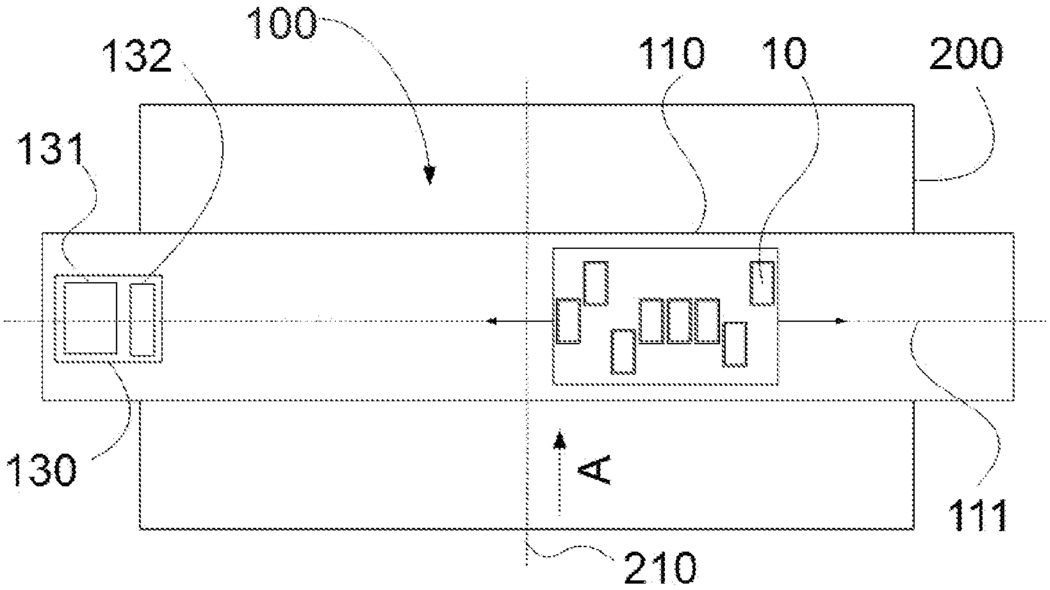
FIG. 1 schematically illustrates a printing system according to an example of the present disclosure.

FIG. 1 schematically illustrates an example of a printing system 100 according to one example of the present disclosure. The printing system 100 comprises plurality of printheads 10 having a plurality of nozzles (not shown in FIG. 1) to deliver print agent. Print agent may be delivered onto a print medium 200. In this disclosure, delivering includes firing, ejecting, spitting or otherwise depositing print agent or ink.

In some examples, a heating element may cause a rapid vaporization of print agent in a print agent chamber or reservoir, increasing an internal pressure inside this print agent reservoir. This increase in pressure makes a drop of print agent exit from the print agent reservoir to the print medium through a nozzle. These printing systems may be called as thermal inkjet printing systems.

In some examples, a piezo electric may be used to force a drop of print agent to be delivered from a print agent chamber or reservoir onto the print medium through a nozzle. A voltage may be applied to the piezo electric, which may change its shape. This change of shape may force a drop of print agent to exit through the nozzle. These printing systems may be called as piezo electric printing systems.

The print medium 200 may advance or move along the advancing axis 210 following the direction represented by arrow A. The print medium may be moved by an advancer (not shown in FIG. 1). An advancer may include a roller and/or a wheel. The print medium 200 may be of any shape or size to be used in the printing system.

The print medium is a material capable of receiving a print agent, e.g. ink. In some examples, the print medium may be a sheet of paper. In some examples, the print medium may be a sheet of cardboard, textile material or plastic material. In some examples, the print medium may comprise polyester based substrates and polyester coated substrates.

The printheads 10 of this figure are mounted on a printhead support 110. The printhead support 110 of FIG. 1 is a carriage. The carriage 110 supporting a plurality of printheads may travel across a scan axis 111 for delivering print agent onto a width of the print medium 200. In this disclosure, a width of a print medium extends substantially perpendicular to the advancing axis 210 and a length of a print medium extends substantially parallel to the advancing axis 210. In this example, the printhead support comprises eight printhead receivers for accommodating eight printheads. In some examples two printheads may be mounted on a carriage. In some examples, four printheads may be mounted on a carriage.

In some examples, the printhead support may statically span substantially the whole width of the print medium. In these examples, the printhead support may be a print bar supporting a plurality of printheads. The printheads may be used in a page-wide array (PWA) printing system.

The printheads 10 of FIG. 1 comprise a plurality of nozzles. Nozzles of the plurality of nozzles may be placed in subgroups. The subgroups may comprise nozzles grouped in rows, i.e. parallel to the scan axis 111, and in columns, i.e. parallel to advancing axis 210. Longer rows may lead to swaths having a greater height (in the advancing axis 210) if all nozzles were to deliver print agent. In this disclosure, a swath refers to an area of a print medium that can be printed by a printhead in a single pass, i.e. from one lateral side of the print medium to the opposite side along the scan axis 111. In some examples, the printhead may deliver print agent on both on the way and the way back.

In the example of FIG. 1, the plurality of printheads 10 mounted on the printhead support 110 are misaligned relative to the scan axis 111. A printhead of the plurality of printheads may be downstream to another printhead of the plurality of printheads. An upstream printhead may deliver printhead on a print medium and a downstream printhead may deliver print agent over a previously deposited print agent. An image on a print medium may thus comprise several layers of print agent delivered by different printheads.

In some examples, the plurality of printheads may be mounted aligned relative to the scan axis.

The printing system 100 of this example comprises a print agent delivery system (not shown in FIG. 1) to supply print agent from a print agent tank or print agent supply station to a printhead. In some examples, two printheads of the plurality of printheads may deliver a print agent with a specific composition, e.g. ink having a specific color. The print agent delivery system may supply this print agent with a specific composition from a print agent tank to these two printheads. Print agent with different composition may be supplied from other print agent tanks to other printheads.

For example, two printheads may deliver white ink to a print medium. The print agent delivery system may provide a passage from a white ink tank to these printheads.

In some examples, three or more printheads may supply a print agent with a specific composition or color. The print agent delivery system may supply print agent with a specific composition to a plurality of printheads.

In some examples, a print agent tank or cartridge may be external from the printing system. A conduit may communicate the print agent tank to the to the printing system. In some examples, a print agent tank may be integrated with the printing system.

The printing system 100 of FIG. 1 comprises a controller 130 to control the operation of the printing system. In some examples, the controller may control print agent delivered by the plurality of nozzles onto the print medium. In some examples, the controller may control the print agent delivery system.

In FIG. 1, the controller 130 includes a processor 131 and a non-transitory machine-readable storage medium 132. The non-transitory machine-readable storage medium 132 is coupled to the processor 131.

The processor 131 performs operations on data. In an example, the processor is an application specific processor, for example a processor dedicated to control a print agent delivery system. The processor 131 may also be a central processing unit for controlling the operation of the printing system.

The non-transitory machine-readable storage medium 132 may include any electronic, magnetic, optical, or other physical storage device that stores executable instructions. The non-transitory machine-readable storage medium 132 may be, for example, Random Access Memory (RAM), an Electrically-Erasable Programmable Read-Only Memory (EEPROM), a storage drive, an optical disk, and the like.

Figure 2A:
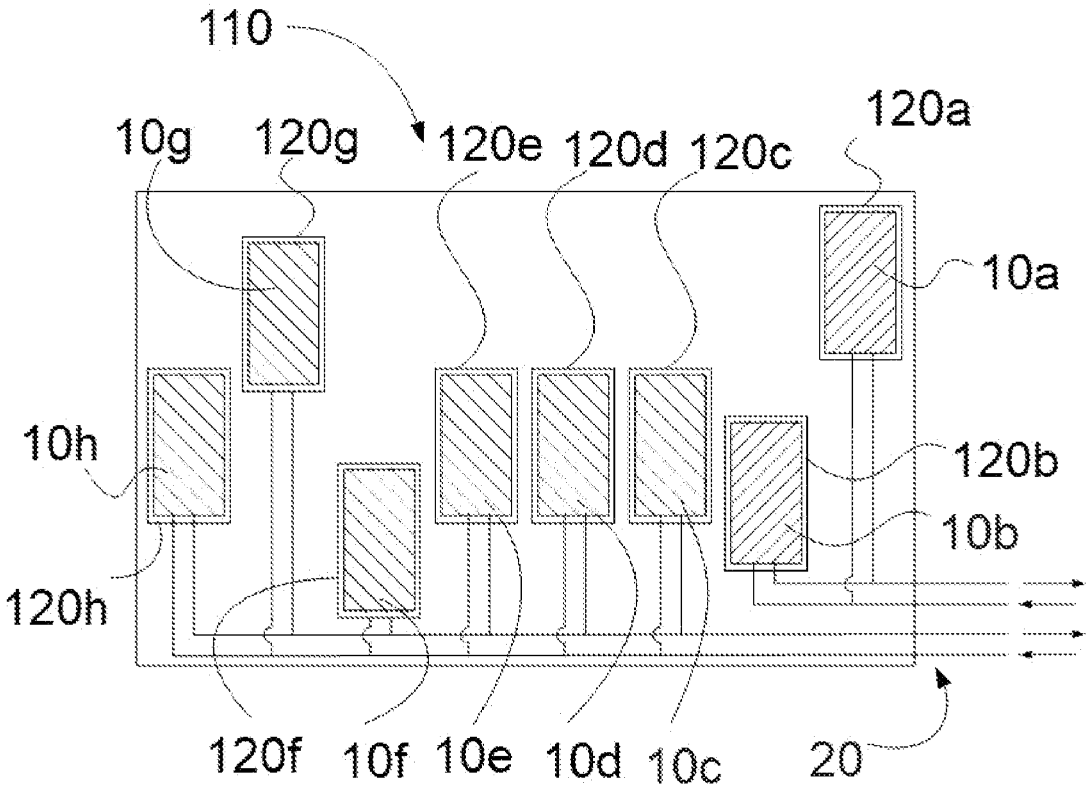
FIG. 2*a* schematically illustrates the printhead support of the printing system of FIG. 1.

FIG. 2*a* schematically illustrates the printhead support of the printing system of FIG. 1. The printhead support 110 comprises eight printhead receivers 120*a-h*. Printheads 10*a-h* may be fitted in the printhead receivers 120. A shape of a printhead receiver may substantially correspond to a shape of a printhead.

In this example, print agent supplied to the printheads 10*a* and 10*b* is different to the print agent delivered to the printheads 10*c*-10*h*. In FIG. 2*a*, the print agent delivery system 20 comprises a first print agent circuit for supplying print agent to the printheads 10*a* and 10*b* accommodated in the printhead receivers 120*a* and 120 and a second print agent circuit for supplying print agent to the printheads 10*c*-10*h* accommodated in the printhead receivers 120*c*-120*h*.

In some examples, independent print agent circuits may supply print agent to each of the printheads 120*c*-120*h*. In some examples, print agent circuits may supply print agent to a single printhead or to a group of printheads. For example, a first print agent circuit may supply print agent to the printheads 10*a*-10*b*, a second print agent circuit to the printheads 10*c*-10*e*, a third print agent circuit to the printhead 10*f* and a fourth print agent circuit to the printheads 10*h*-10*g*. Accordingly, four different print agents, e.g. color, may be delivered to the print medium.

The print agent delivery system may recirculate print agent through the printheads inserted into the printhead receivers. For example, intermediate tanks, solenoid valves and print agent pumps may be used for recirculating print agent.

However, some types of print agents may comprise pigments that may precipitate. Particles or pigments with higher density may tend to precipitate. For example, in print agents comprising metallic particles, these metallic particles may tend to precipitate. White inks may comprise titanium oxide pigments that may precipitate.

In some examples, printheads delivering print agent with heavy particles, e.g. white ink, may be removed from the printhead receivers. These removed printheads may be stored out of the printing systems, e.g. in an external agitation unit. Print agent contained in a print agent reservoir of these printheads may thus be stirred or agitated to prevent particles from precipitating. Printheads not in used may thus be removed from the printing system and stored in an external agitation unit. Operational life of the printhead may consequently be extended. In addition, accumulation of precipitated particles in nozzles may be reduced.

In FIG. 2*a*, the printheads 10*a* and 10*b* are connected to a white ink tank through the print agent delivery system 20. White ink may thus be contained in a print agent reservoir of the printhead (not shown in FIG. 2*a*). If one of these printheads is not in used, the printhead may be removed and replaced by a recirculating device.

Figure 2B:
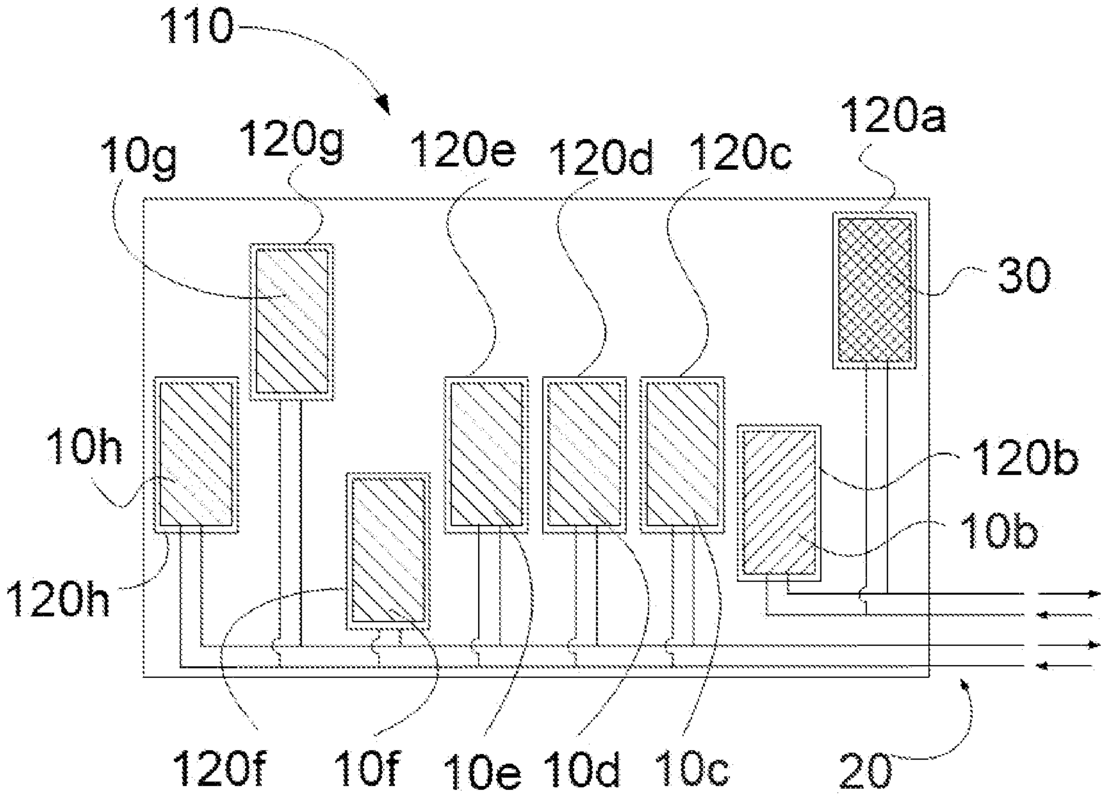
FIG. 2*b* shows the printhead support of FIG. 2*a* in which one printhead has been replaced by a recirculating device.

FIG. 2*b* shows the printhead support of FIG. 2*a* in which one printhead has been replaced by a recirculating device. In FIG. 2*b* a recirculating device 30 is fitted in the printhead receiver 120*a*. The recirculating device 30 comprises a first recirculation device port and a second recirculation device port in fluid communication with the first recirculation device port. Print agent may thus flow through the recirculation device.

Figure 3:
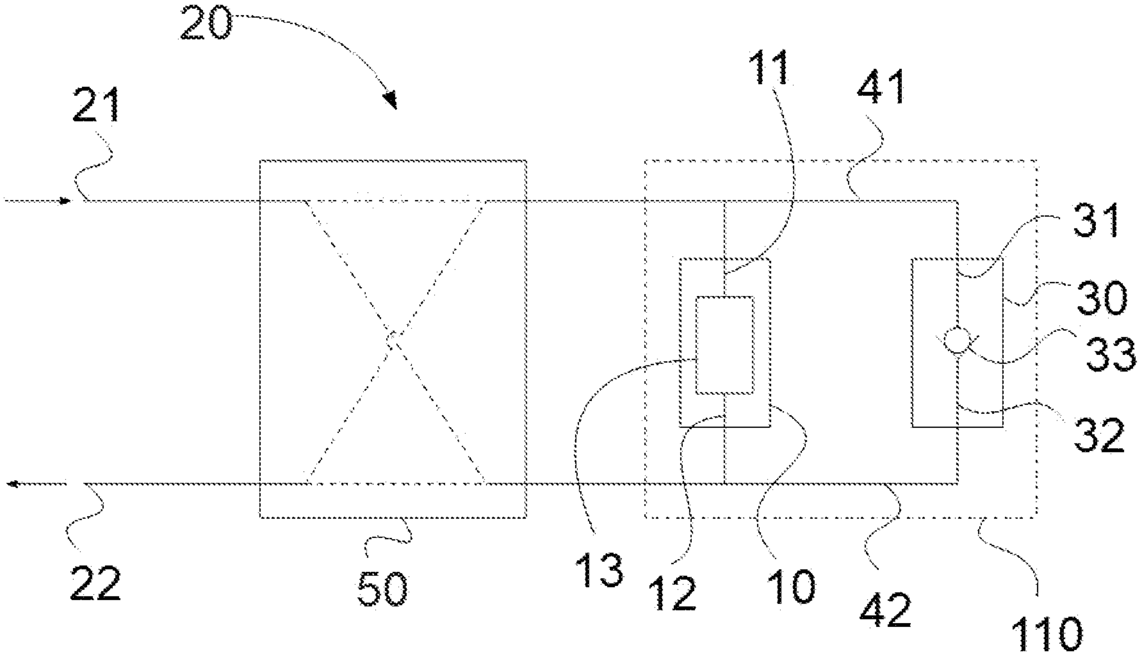
FIG. 3 schematically represents a print agent delivery system for a printing system according to an example of the present disclosure.

FIG. 3 schematically represents a print agent delivery system for a printing system according to an example of the present disclosure. In this example, the print agent delivery system may supply print agent to a printhead and to a recirculation device connected in parallel. In some examples, the print agent delivery system may supply the print agent to a printhead or a plurality of printheads and to a recirculation device or a plurality of recirculation devices. For example, the print agent delivery system may connect in parallel a printhead and two recirculation devices.

The print agent delivery system 20 for a printing system of FIG. 3 comprises an inlet 21 for inputting print agent into the print agent delivery system 20 and an outlet 22 for outputting print agent from the print agent delivery system

20. The print agent delivery system 20 further comprises a printhead 10 to be on a printhead receiver (not shown in FIG. 3) of a printhead support 110 of a printing system for delivering a print agent and a recirculation device 30 to be on a printhead receiver (not shown in FIG. 3) of a printhead support 110 of a printing system. In this example, the printhead and the recirculation device are in a respective printhead receiver.

The printhead 10 of FIG. 3 comprises a print agent reservoir 13, a first printhead port 11 and a second printhead port 12 in fluid communication with the first port 11 via the print agent reservoir 13. The recirculation device 30 of FIG. 3 comprises a first recirculation port 31, a second recirculation port 32 in fluid communication with the first recirculation port 31 and a check valve 33 to allow fluid flow from the second recirculation port 32 to the first recirculation port 31 and to prevent fluid flow from the first recirculation port 31 to the second recirculation port 32.

The print agent delivery system of FIG. 3 further comprises a first flow path 41 to connect the first printhead port 11 and the first recirculation port 31 when the printhead 10 and the recirculation device 30 are in respective printhead receivers, a second flow path 42 to connect the second printhead port 12 and the second recirculation port 32 when the printhead 10 and the recirculation device 30 are in respective printhead receivers and a valve assembly 50 to selectively connect the inlet 21 to the first flow path 41 to allow print agent to flow through the printhead 10 or to the second flow path 42 to allow print agent to flow through the recirculation device 30.

Print agent may recirculate through the print agent delivery system 20 when a printhead 10 and a recirculation device 30 are on a respective printhead receiver of a printhead support 110, e.g. a carriage. When the inlet 21 is connected to first flow path 41, the check valve 33 prevents fluid flow from the first recirculation port 31 to the second recirculation port 32, and then print agent flows through the printhead 10 from the first printhead port 11 to the second printhead port 12. Print agent contained in the printhead reservoir 13 may thus be discharged. Accumulation of particles of print agent in the printhead and print agent clogging when a printhead and a recirculation device are mounted in a printhead support, e.g. a carriage, may thus be reduced.

When the inlet 21 is connected to second flow path 42, the check valve 33 allows fluid flow from the second recirculation port 32 to the first recirculation port 31. As the recirculation device may offer less resistance to fluid flow than the printhead, print agent is prevented from flowing through the printhead when the inlet is connected the second flow path. Print agent may thus quickly recirculate from the inlet to the outlet. For example, a print agent tank may be connected to the inlet and the print agent contained in this print agent tank may flow through the print agent delivery system. Accordingly, print agent contained in print agent tanks may recirculate. Precipitation or accumulation of particles in print agent tanks or any other parts of the print agent delivery system, e.g. titanium oxide pigments of white inks, may thus be reduced.

The valve assembly 50 may be separated from the printhead support 110. Accordingly, weight of the printhead support, e.g. carriage, may be reduced. In addition, versatility of the print agent delivery system may be enhanced and independent fluid flow paths for each of the printhead receivers may be avoided.

In some examples, the valve assembly 50 may comprise a plurality of valves. The plurality of valves may be selectively actuated to connect the inlet to the first flow path or to the second flow path. Valves may control the flow of print agent by opening, closing, or partially obstructing a passageway.

In some examples, the plurality of valves may comprise a two-way valve. A two-way valve may comprise two ports. If the two-way valve is open, a fluid may flow between the ports and if the two-way valve is closed, a passage between the ports is blocked.

In some examples, the plurality of valves may comprise a three-way valve. A three-way valve may comprise three ports and may create a passageway between two of these three ports. For example, a three-way valve may comprise an inlet and two outlets. The inlet may be selectively connected to each one of the outlets.

In some examples, the plurality of valves may comprise a solenoid valve. A solenoid valve may be electromechanically operated. In some examples, a solenoid valve may comprise a two-way valve. In some examples, a solenoid valve may comprise a three-way valve.

The check valve 33 of this example is a one-way valve that allows fluid flow in one direction but prevents fluid flow in an opposite direction. In some examples, the check valve may comprise an umbrella check valve. This may simplify the control of print agent flow in the print agent delivery system.

An umbrella check valve may comprise a valve seat and an umbrella-shaped or diaphragm-shaped blocking element for sealing the valve seat. The umbrella-shaped blocking element may flatten out against the valve seat. The valve seat may thus be sealed by the umbrella-shaped blocking element. A pressure greater than a predetermined pressure may lift the umbrella-shaped blocking element to create a passageway through the valve seat.

In some examples, a predetermined pressure may be 1 psi. Accordingly, a pressure greater than 1 psi in the second recirculation port may force the umbrella valve check to lift and, thus, to allow fluid flow from the second recirculation port to the first recirculation port. In some examples, the predetermined pressure may be 3 psi.

In some examples, an umbrella-shaped blocking element may comprise an elastomer. The umbrella-shaped blocking element may deform upon a pressure greater than a predetermined pressure is experienced to allow fluid flow. In some examples, the umbrella check valve may comprise a spring to move the umbrella-shaped blocking element for allowing or blocking fluid flow.

In some examples, the recirculation device may comprise an interconnecting conduit connecting the first recirculation port to the second recirculation port. The check valve may be in the interconnecting conduit.

In some examples, the recirculation device may comprise a housing to fit into the printhead receivers of the printhead support. The printhead support, e.g. a carriage may comprise a plurality of printhead receivers. The recirculation device may thus be fitted in any of these printhead receivers.

In some examples, the housing may comprise a shape similar to a shape of printheads mounted on the printhead receivers. The housing may thus seal the printhead receiver where the recirculation device is mounted. Contamination of the print agent may thus be prevented.

In some examples, the printhead may comprise a suction pressure generator to generate a suction pressure in the print agent reservoir of the printhead. This suction pressure may cause print agent to enter into the print agent reservoir.

In some examples, the suction pressure generator may comprise a valve regulating print agent flowing from the first printhead port to the print agent reservoir. This valve may block the entry of the print agent into the print agent reservoir. While the valve is blocking the print the first printhead port, print agent contained in the print agent reservoir may be discharged, e.g. some drops of print agent may be delivered to a print medium or to the second printhead port. This may create a differential pressure between the print agent reservoir and the first printhead port. The valve may then be actuated to allow print agent to flow towards the print agent reservoir. A suction pressure may then be generated in the print agent reservoir to facilitate the entry of print agent into print agent reservoir. In some examples, the suction pressure generator may comprise an additional valve regulating print agent flow from the print agent reservoir to the second printhead port.

In some examples, the suction pressure generator may comprise an expandable bag inside the print agent reservoir. In an expanded state, the expandable bag may occupy a space inside the print agent reservoir. In a compressed state, the expandable bag may leave a space inside the print agent reservoir which may be occupied by the print agent.

In some examples, the print agent reservoir may comprise a first and a second chamber. The first chamber may be connected to the second chamber through an opening. Print agent may thus flow through the opening from the first chamber to the second chamber. The first printhead port may be connected to the first chamber and the second printhead port to the second chamber.

In some examples, the printhead may comprise a suction pressure generator and a print agent reservoir including a first and a second chamber. The suction pressure generator may allow print agent to flow from the first chamber to the second chamber. The suction pressure generator may be according to any of the examples herein disclosed. For example, the suction pressure generator may comprise a valve for regulating print agent flow from the first printhead port to the first chamber. An additional valve may be at the second printhead port to control print agent flow from the second chamber to the second printhead port. In some examples, an expandable bag according to any of the examples herein disclosed may be inside the first chamber and/or the second chamber to generate a suction pressure.

In some examples, the print agent delivery system of FIG. 3 may comprise pumps, intermediate tanks and/or print agent valves.

In some examples, the print agent delivery system may comprise a controller. The controller may be a dedicated controller to control the operation of the print agent delivery system or a printing system controller to control the operation of the printing system. The controller may comprise a processor and a non-transitory machine-readable storage medium according to any of the examples herein disclosed.

The controller may detect if a printhead and/or a recirculation device is on printhead receivers of the printhead support and control the valve assembly to selectively connect the inlet to the first flow path or to the second flow path in function of the printheads and recirculation devices detected.

The controller may detect the printheads and the recirculation devices fitted in each of the printhead receivers of the printhead support, e.g. of the carriage. The controller may thus distinguish the recirculation devices accommodated in the printhead receivers from the printheads accommodated in the printhead receivers. Accordingly, the controller may detect a printhead support configuration.

In some examples, a printhead and/or a recirculation device may comprise an identifiable feature. The controller may identify the identifiable feature. A detector or a sensor may be used for identifying the identifiable feature of the printhead and of the recirculation device.

For example, if the printhead receivers accommodate printheads, the valve assembly may connect the inlet to the first flow path. Similarly, if the printhead receivers accommodate recirculation devices, the valve assembly may connect the inlet to the second flow path. If the controller detects that the printhead receivers accommodate a printhead and a recirculating device, the valve assembly may be activated to selectively connect the inlet to the first flow path to allow print agent to flow through the printhead or the inlet to the second flow path to allow print agent to flow through the recirculation device.

In some examples, the controller may activate a pressure suction generator according to any of the examples herein disclosed.

Figure 4A:
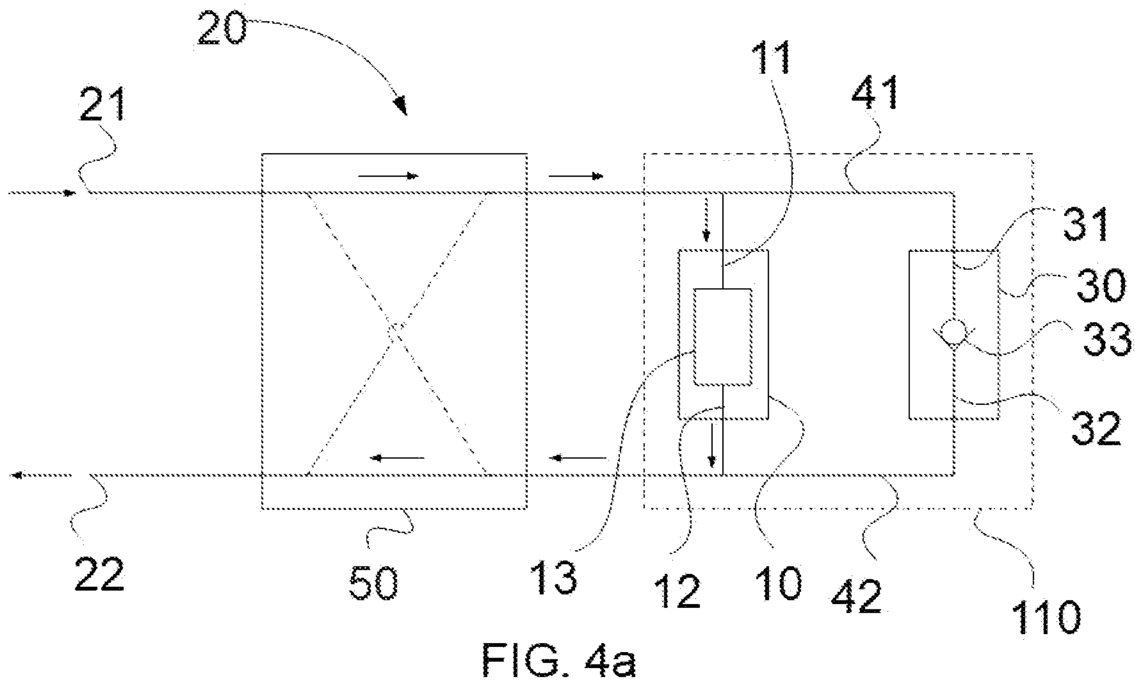
FIGS. 4*a* and 4*b* respectively represents the print agent delivery system of FIG. 3 in which the valve assembly connects the inlet to first path flow and the inlet to the second path flow.
Figure 4B:
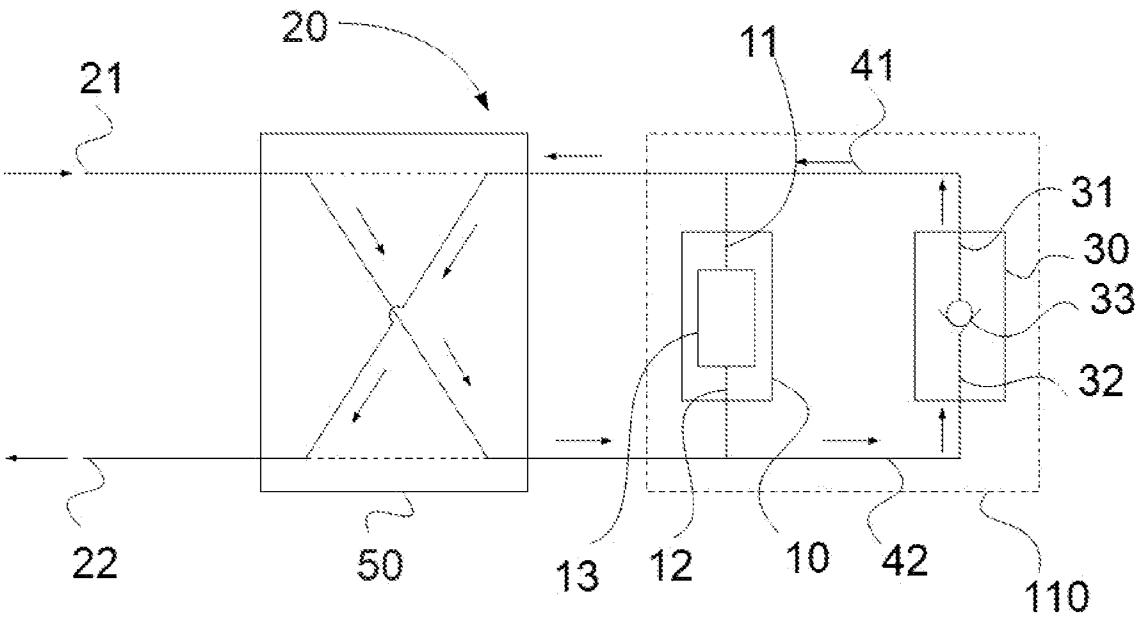

FIGS. 4*a* and 4*b* respectively represents the print agent delivery system of FIG. 3 in which the valve assembly connects the inlet to the first path flow and the inlet to the second path flow.

In FIG. 4*a*, the valve assembly 50 connects the inlet 21 to first flow path 41 and the outlet 22 to the second flow path 42. In FIG. 4*b*, the valve assembly 50 connects the inlet to the second flow path 42 and the outlet 22 to the first flow path 41.

In these figures, print agent flow direction is indicated by arrows. The check valve 33 of the recirculation device 30 of these figures prevents fluid flow from the first recirculation port 31 to the second recirculation port 32, e.g. a fluid blocking direction, but allows fluid flow from the second recirculation port 32 to the first recirculation port 31, e.g. fluid passing direction.

In FIG. 4*a*, the check valve 33 blocks print agent flow from the first recirculation port 31 to the second recirculation port 32. Print agent may thus enter into the printhead reservoir 13 through the first printhead port 11 and exit through the second printhead port 12.

Print agent may flow from the inlet 21 to the first flow path 41 through the valve assembly 50, then print agent may flow from the first flow path 41 to the second flow path 42 through the printhead 10 and finally, from the second flow path 42 to the outlet 22 through the valve assembly 50.

As print agent may flow through the printhead 10, the print agent delivery system 20 may be in a printhead circulation mode. Print agent contained in the printhead reservoir 13 may be discharged. Print agent may be supplied from the inlet and may be forced to recirculate through the printhead. For example, the inlet may be connected to a print agent tank.

In some examples, a suction pressure generator device may facilitate circulation of print agent through the printhead.

In FIG. 4*b*, the check valve 33 allows print agent flow from the second recirculation port 32 to the first recirculation port 31. In this print agent direction, the recirculation device 30 offers less resistance to fluid flow than the printhead. Accordingly, print agent may be forced to circulate through the recirculation device 30.

Print agent may flow from the inlet 21 to the second flow path 42 through the valve assembly 50, then print agent may flow from the second flow path 42 to the first flow path 41 through the recirculation device 30 and finally, from the first flow path 41 to the outlet 22 through the valve assembly 50.

As print agent may flow through the recirculation device 30, the print agent delivery system 20 may be in a recirculation device circulation mode. Print agent may recirculate from the inlet to the outlet. Print agent may be supplied from the inlet and may be forced to recirculate through the recirculation device.

Figure 5:
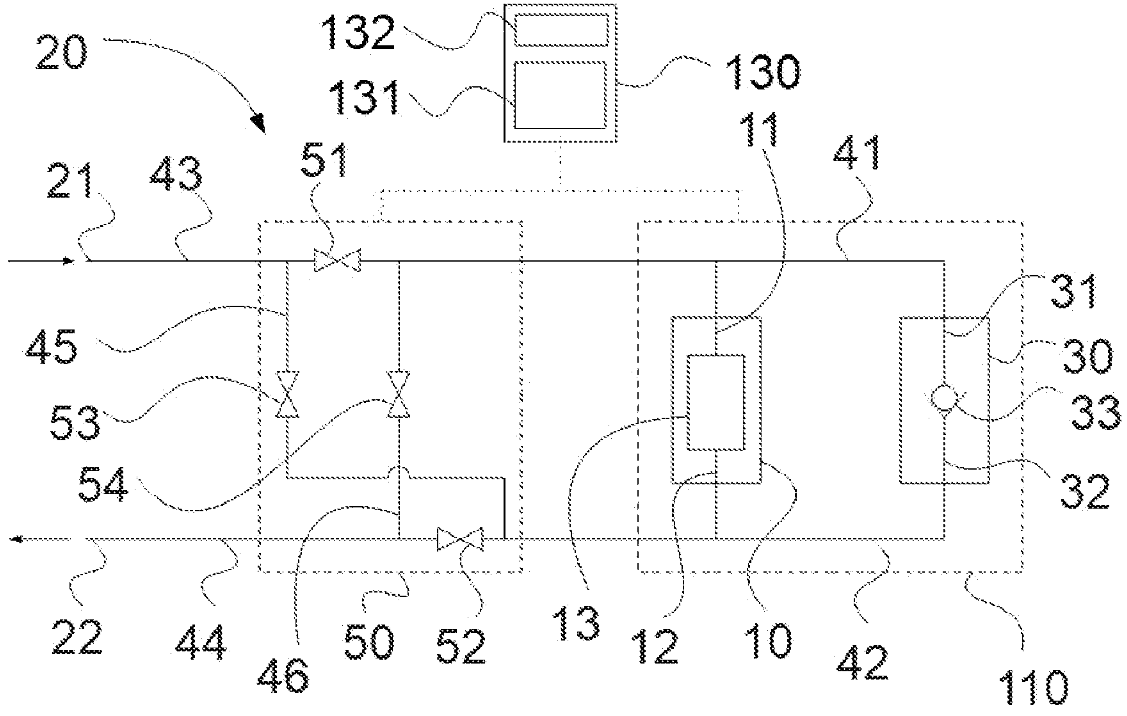
FIG. 5 schematically represents a print agent delivery system for a printing system according to an example of the present disclosure.

FIG. 5 schematically represents a print agent delivery system for a printing system according to an example of the present disclosure.

The print agent delivery system 20 for a printing system of FIG. 5 comprises an inlet 21 for inputting print agent into the print agent delivery system 20 and an outlet 22 for outputting print agent from the print agent delivery system 20. The print agent delivery system 20 further comprises a printhead 10 on a printhead receiver (not shown in FIG. 5) of a printhead support 110 of a printing system for delivering a print agent and a recirculation device 30 on a printhead receiver (not shown in FIG. 5) of a printhead support 110 of a printing system. The printhead and the recirculation device may be according to any of the examples herein disclosed.

In this example, a printhead and a recirculation device connected in parallel are illustrated. In some examples, the print agent delivery system may comprise additional printheads and/or recirculation devices. The printhead support may thus comprise a plurality of printhead receivers.

The printhead 10 of FIG. 5 comprises a print agent reservoir 13, a first printhead port 11 and a second printhead port 12 in fluid communication with the first port 11 via the print agent reservoir 13. The recirculation device 30 of FIG. 5 comprises a first recirculation port 31, a second recirculation port 32 in fluid communication with the first recirculation port 31 and a check valve 33 to allow fluid flow from the second recirculation port 32 to the first recirculation port 31, e.g. in a fluid passing direction and to prevent fluid flow from the first recirculation port 31 to the second recirculation port 32, e.g. in a fluid blocking direction.

In this figure, a first flow path 41 connects the first printhead port 11 and the first recirculation port 31 and a second flow path 42 connects the second printhead port 12 and the second recirculation port 32.

The print agent delivery system of FIG. 5 comprises an input flow path 43 connected to the inlet 21 and output flow path 44 connected to the outlet 22. In this figure, an input branch flow path 45 connects the input flow path 43 to the second flow path 42 and an output branch flow path 46 connects the first flow path 41 to the output flow path 44.

In this figure, the valve assembly 50 comprises a first valve 51 selectively connecting the input flow path 43 to the first flow path 41 and second valve 52 selectively connecting the output flow path 44 to the second flow path 42. Furthermore, the valve assembly 50 of FIG. 5 comprises a third valve 53 at the input branch flow path 45 and a fourth valve 54 at the output branch flow path 46.

These valves may be opened to allow a fluid flow or closed to block a fluid flow. The first to fourth valves of FIG. 5 are two-way valves. These valves may comprise two-way solenoid valves.

Different circulation modes may be provided by selectively opening and closing these valves, e.g. a printhead circulation mode and/or a recirculation device circulation mode. The valve assembly may selectively connect the inlet to the first flow path or to the second flow path by controlling these four valves.

The print agent delivery system 20 of FIG. 5 comprises a controller 130. The controller 130 is coupled to the printhead support 110 and to the valve assembly 50. The controller may be according to any of the examples herein disclosed.

The controller may detect if a printhead and/or a recirculation device is on printhead receivers of the printhead support. The controller may thus identify a position of the printheads and/or recirculation devices mounted in the printhead receivers of the printhead support. For example, the controller may detect an identifiable feature of a printhead and/or of a recirculation device. A printhead support configuration may thus be determined.

The controller 130 may control the valve assembly to selectively connect the inlet to the first flow path or to the second flow path in function of the printheads and recirculation devices detected. In some examples, the controller may activate the opening and closing of the first valve, the second valve, the third valve and the fourth.

The controller 130 of FIG. 5 is a controller to control the operation of the print agent delivery system. In some examples, the controller may also control other operations of a printing system.

In this figure, the controller 130 comprises a processor 131 coupled to a non-transitory machine-readable storage medium 132. The processor 131 and/or the non-transitory machine-readable storage medium 132 may be according to any of the examples herein disclosed.

Figure 6A:
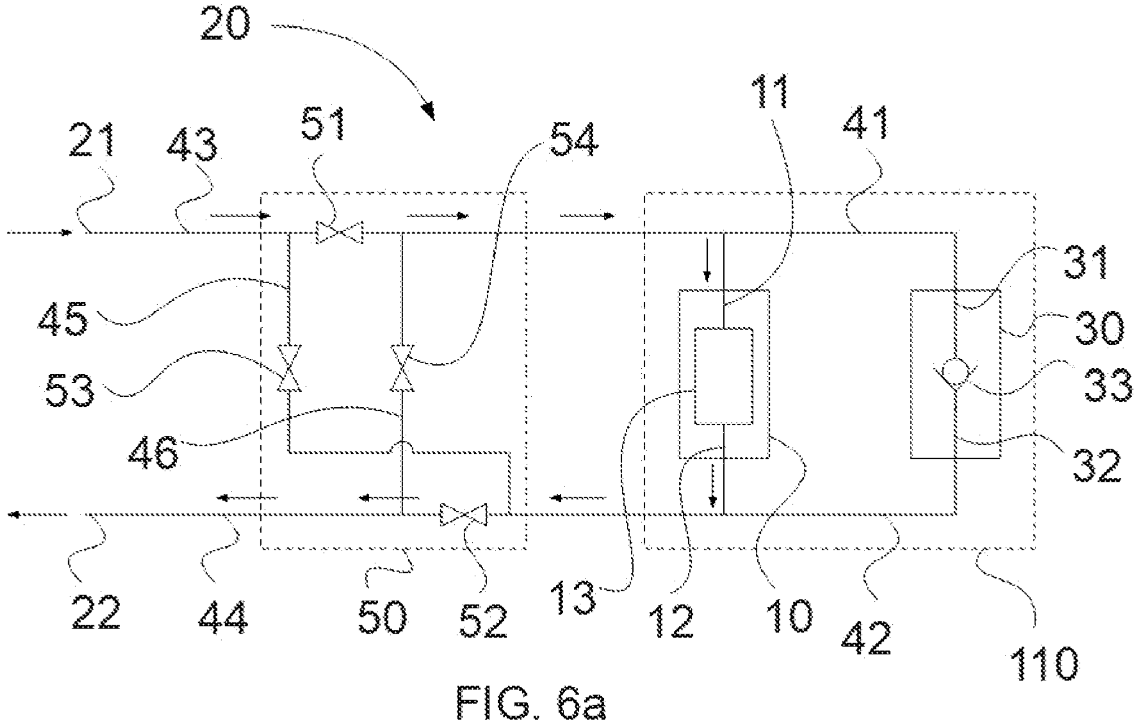
FIGS. 6*a* and 6*b* respectively represents the print agent delivery system of FIG. 5 in which the valve assembly connects the inlet to the first path flow and the inlet to the second path flow.
Figure 6B:
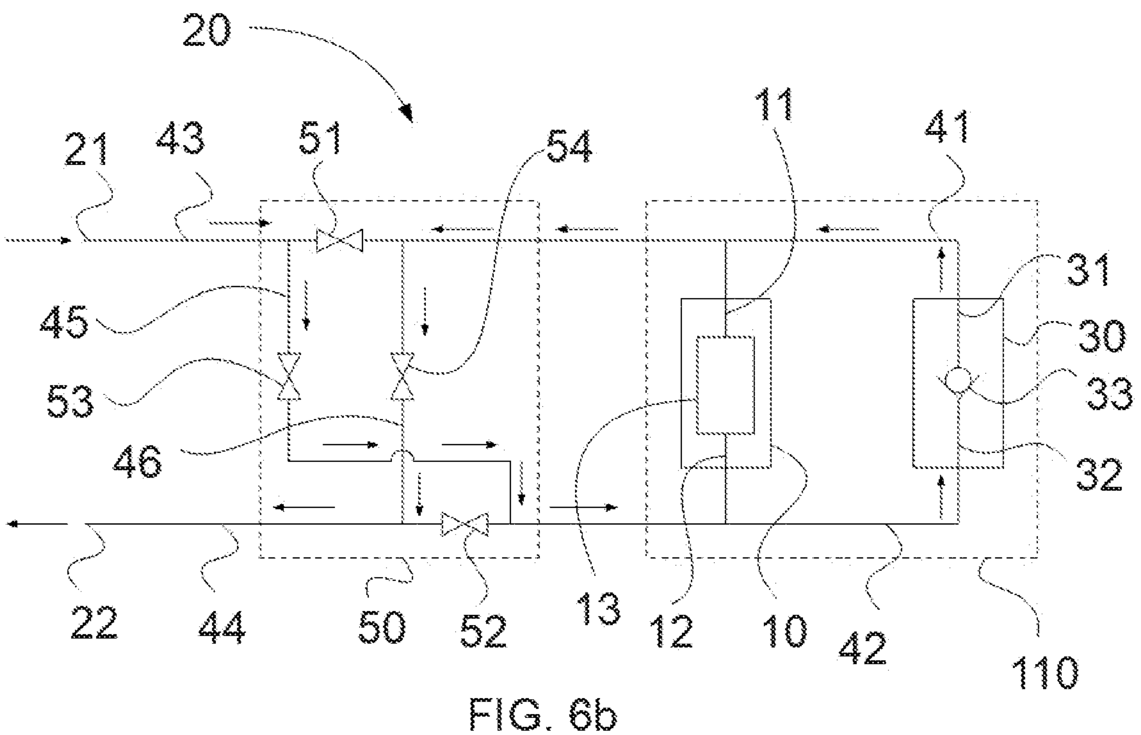

FIGS. 6*a* and 6*b* respectively represents the print agent delivery system of FIG. 5 in which the valve assembly connects the inlet to the first path flow and the inlet to the second path flow. As in FIGS. 4*a* and 4*b*, in FIGS. 6*a* and 6*b* the arrows indicate the print agent flow direction.

In FIG. 6*a*, a printhead circulation mode is illustrated. In the printhead circulation mode print agent circulates through the printhead 10. Print agent may flow along the input flow path 43 from the inlet 21. In FIG. 6*a*, the third valve 53 is closed and the first valve 51 is open. Therefore, print agent may pass through the first valve 51 towards the first flow path 41. Print agent flows in a blocking direction relative to the check valve 33 so that the fluid flow from the first recirculation port 31 to the second recirculation port 32 is prevented. Consequently, print agent may enter into the printhead reservoir 13 through the first printhead port 11. Print agent contained into the printhead reservoir may exit to the second flow path 42 through the second printhead port 12.

The second valve 52 is open and the fourth valve 54 is closed. Print agent may thus pass through the second valve 52 from the second flow path 42 to output flow path 44.

In FIG. 6*b*, a recirculation device circulation mode is illustrated. In the recirculation device circulation mode print agent circulates through the recirculation device 30 as the check valve 33 allows fluid flow from the second recirculation port 32 to the first recirculation port 31. In this figure, the first valve 51 and the second valve 52 are closed and the third valve 53 and the fourth valve 54 are open.

In FIG. 6*b*, print agent may flow from the inlet 21 to the input flow path 43. As the first valve 51 is closed and the third valve 53 is open, print agent flows from the input flow path 43 to the second fluid flow 42 through the input branch flow path 45 and the third valve 53. Then, print agent may circulate through the recirculation device 30 and exit to the first flow path 41. As the first valve 51 is closed and the fourth valve 54 is open, print agent may flow along the output branch flow path 46. Then, print agent may be guided to the outlet 22 by the output flow path 44.

The valves may be operated to opening and closing so as to switch between a printhead circulation mode (FIG. 6*a*) and a recirculation device circulation mode (FIG. 6*b*).

In some examples, three-way valves, e.g. three-way solenoid valves, may be used to switch between a printhead circulation mode and a recirculation device circulation mode. For example, four three-way valves may be used to connect or disconnect the flow paths of FIG. 5.

Figure 7:
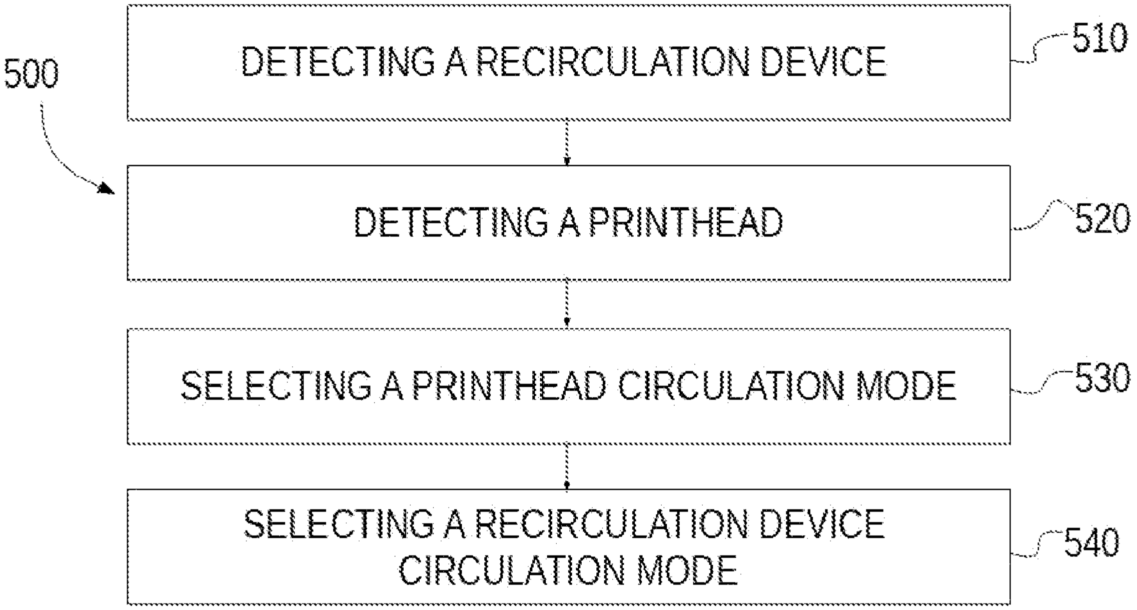
FIG. 7 is a block diagram of an example of a method to recirculate print agent in a printing system.

FIG. 7 is a block diagram of an example of a method to recirculate print agent in a printing system. The method 500 to recirculate print agent in a printing system comprises detecting 510 a recirculation device comprising a check valve to allow fluid flow in a passing direction but to prevent fluid flow in a fluid blocking direction, the fluid blocking direction being opposite to the fluid blocking direction. At block 520, detecting a printhead connected in parallel to the detected recirculation device. The method 500 further comprises selecting 530 a printhead circulation mode to circulate print agent through the detected printhead and selecting 540 a recirculation mode to circulate print agent through the detected recirculation device.

Print agent may be recirculated through a print agent delivery system comprising a printhead and a recirculation device. Accumulation of pigments of print agent along the print agent delivery system may be prevented. In addition, as a printhead has been replaced by a recirculation device, this printhead may be stored in an external agitation unit to extend the operational life.

The method 500 may be applied to any of the examples of print agent delivery systems and/or printing systems herein disclosed.

In some examples, detecting 510 a recirculation device with a check valve may identify if a recirculation device is mounted in a printhead receiver of the plurality of printhead receivers of a printhead support. Accordingly, a recirculation device mounted in a printhead receiver of a carriage may be detected. This may indicate that a printhead has been replaced by the detected recirculation device. A printhead support configuration may thus be determined.

In some examples, detecting a recirculation device may comprise detecting a position of the recirculation device relative to a position of a printhead. Detecting a recirculation device may comprise detecting a position of the recirculation relative to the printhead receivers of the printhead support.

In some examples, detecting a recirculation device may comprise identifying an identifiable feature of the recirculation device. A chip may be an example of an identifiable feature. The identifiable feature may provide data about the recirculation device, e.g. time in use and/or serial number.

Similar to detecting a recirculation device, detecting a printhead connected in parallel to the detected recirculation device may comprise identifying a printhead mounted in a printhead receiver of a printhead support. In some examples, a position of the detected printhead may be detected. In some examples, an identifiable feature, e.g. indicating time in use and/or serial number, of the printhead may be identified.

In some examples, the method may comprise determining if a printhead or a recirculation device is mounted in each of the printhead receivers of a printhead support. For example, a sensor associated with each of the printhead receivers may identify an identifiable feature.

In a printhead circulation mode, print agent flows through the detected printhead. FIGS. 4*a* and 6*a* are examples of a printhead circulation mode. A printhead circulation mode may be selected by operating a valve assembly, e.g. a plurality of valves, of the print agent delivery system to force print agent to flow in the blocking direction. The valve assembly may according to any of the examples herein disclosed.

In some examples, selecting a printhead circulation mode may comprise generating a suction pressure in a print agent reservoir of the detected printhead. A suction pressure generator according to any of the examples herein may be activated to generate such a suction pressure.

In some examples, selecting a printhead circulation mode may comprise activating a print agent flow path between an inlet and an outlet of a print agent delivery system to flow print agent through the detected printhead along the fluid blocking direction. For example, a valve assembly may be actuated to connect the inlet to a first printhead port and the second printhead port to the outlet. FIGS. 4*a* and 6*a* are examples wherein the valve assembly is actuated to activate a print agent flow path between the inlet and the outlet through the detected printhead in a fluid blocking direction, i.e. in a direction that the check valve of the recirculation prevents fluid flow.

In a recirculation device circulation mode, print agent flows through the detected recirculation device. FIGS. 4*b* and 6*b* are examples of a recirculation device circulation mode. A recirculation device circulation mode may be selected by operating a valve assembly, e.g. a plurality of valves, of the print agent delivery system to force print agent to flow in the passing direction. The valve assembly may be according to any of the examples herein disclosed.

In some examples, selecting a recirculation circulation mode may comprise activating a print agent flow path between an inlet and an outlet of a print agent delivery system to flow print agent through the detected recirculation device along the fluid passing direction. A valve assembly may be actuated to activate a print agent flow path between the inlet and a second recirculation port and between a first recirculation port and the outlet.

In some examples, the method to recirculate print agent in a printing system may comprise switching from a printhead circulation mode to a recirculation device circulation mode after a predetermined time. In some examples, this predetermined time may be between 30 and 120 seconds. In some examples, print agent may be recirculated along the print agent delivery system during this predetermined time. Similarly, the method may comprise switching from the recirculation device circulation mode to the printhead circulation mode after a predetermined time.

In some examples, the method to recirculate print agent in a printing system may comprise controlling a valve assembly to switch between the printhead circulation mode and the recirculation device circulation mode. Valves of the valve assembly may operated to activate a print agent flow path in a blocking direction so as to allow print agent to flow through the printhead (printhead circulation mode) or a print agent flow path in the passing direction so as to allow print to flow through the recirculation device (recirculation device circulation mode).

For example, the valves of FIGS. 6*a* and 6*b* may be operated to switch between the printhead circulation mode and the recirculation device circulation mode. For example, in FIG. 6*a* the first valve 51 and the second valve 52 may be actuated to close the fluid flow through them and the third valve 53 and the fourth valve 54 may be actuated to open to allow print agent flow through them. Accordingly, the valves may be actuated for switching from a printhead circulation mode (FIG. 6*a*) to a recirculation device circulation mode (FIG. 6*b*).

In some examples, the method may comprise selecting a printhead circulation mode if a recirculation device is not detected in a printhead receiver. In some examples, the method may comprise selecting a recirculation device circulation mode if a printhead is not detected in a printhead receiver.

Figure 8:
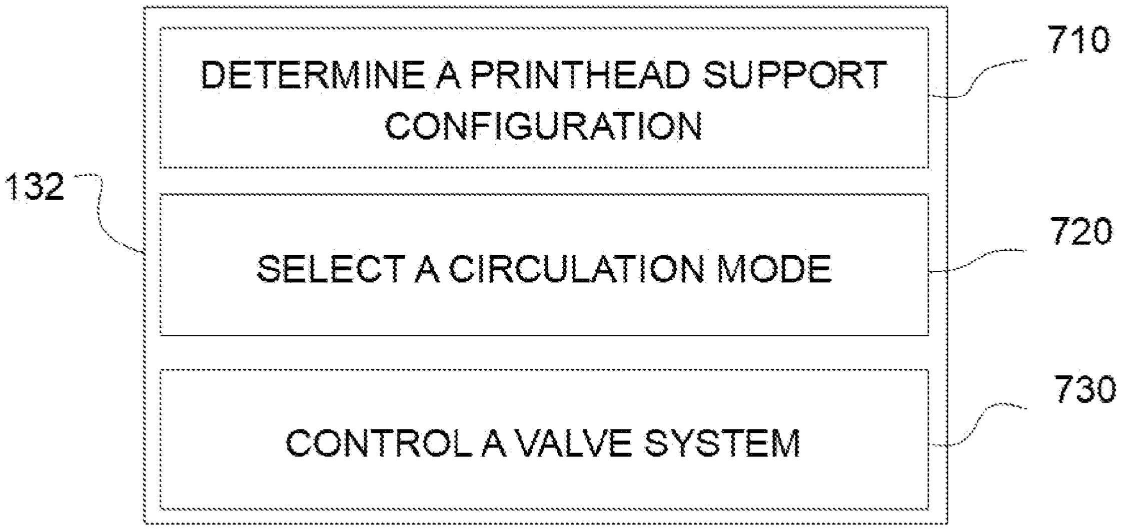
FIG. 8 represents a non-transitory machine-readable storage medium according to an example of the present disclosure.

FIG. 8 represents a non-transitory machine-readable storage medium according to an example of the present disclosure. The non-transitory machine-readable storage medium 132 is encoded with instructions which, when executed by a processor, cause the processor to determine a printhead support configuration by identifying recirculation devices having a check valve and printheads mounted on a printhead support of a printing system as represented at block 710, select a circulation mode based on the determined printhead support configuration as represented at block 720 and control a valve assembly based on the selected circulation mode to activate a print agent flow path between an inlet and an outlet of a print agent delivery system through the printhead support as represented at block 730.

The processor may be according to any of the examples herein disclosed. For example, the processor may be coupled to the non-transitory machine-readable storage medium. For example, a controller according to any of the examples herein disclosed may comprise the processor and the non-transitory machine-readable storage medium.

The recirculation devices and the printheads mounted on a printhead support may be identified according to any of the examples herein disclosed. Depending on the printhead support configuration a circulation mode may be selected. For example, if no recirculation devices mounted on the printhead receivers are determined, the processor may select a printing circulation mode. For example, if no printheads are mounted on the printhead receivers, the processor may select a recirculation device circulation mode. For example, if a printhead and a recirculation device are identified, the processor may firstly select a printhead circulation mode and then a recirculation device circulation mode, or vice versa.

A valve assembly may be controlled by the processor to activate a print agent flow path between an inlet and an outlet of a print agent delivery system through the printhead support. In some examples, the valve assembly may be controlled to activate a print agent flow path in a printhead circulation mode. In some examples, the valve assembly may be controlled to activate a print agent flow path in a recirculation device circulation mode.

In some examples, the non-transitory machine readable storage medium may cause the processor to select a recirculation device circulation mode if a recirculation device is identified to allow print agent flow through the recirculation device and to control the valve assembly to activate a print agent flow path between the inlet and the outlet of the print agent delivery system in a direction that the check valve allows fluid flow. The processor may thus control the valve assembly to activate a print agent flow path in a recirculation device circulation mode. The valve assembly may be controlled according to any of the examples herein disclosed.

In some examples, the non-transitory machine readable storage medium may cause the processor to select a printhead circulation mode if a printhead is identified, to generate a suction pressure in a print agent reservoir of the identified printhead and to control the valve assembly to activate the print agent flow path between the inlet and the outlet of a print agent delivery in a direction opposite to the direction that the check valve allows fluid flow.

In some examples, the processor may control the valve assembly for switching between the printhead circulation mode and the recirculation device circulation mode.

The instructions encoded in the non-transitory machine-readable storage medium for the processor represented at blocks 710, 720 and 730 may participate in recirculating a print agent along a print agent delivery system.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any.

The invention claimed is:

1. A method to recirculate print agent in a printing system:
- detecting a recirculation device comprising a check valve to allow fluid flow in a fluid passing direction but to prevent fluid flow in a fluid blocking direction, the fluid blocking direction being opposite to the fluid passing direction;
- detecting a printhead connected in parallel to the detected recirculation device;
- selecting a printhead circulation mode to circulate print agent through the detected printhead;
- selecting a recirculation device circulation mode to circulate print agent through the detected recirculation device, wherein the detected printhead and the detected recirculation device are located on a same printhead support.

2. The method according to claim 1, wherein selecting a printhead circulation mode comprises generating a suction pressure in a print agent reservoir of the detected printhead.

3. The method according to claim 1, wherein selecting a printhead circulation mode comprises activating a print agent flow path between an inlet and an outlet of a print agent delivery system to flow print agent through the detected printhead along the fluid blocking direction.

4. The method according to claim 1, wherein selecting a recirculation device circulation mode comprises activating a print agent flow path between an inlet and an outlet of a print agent delivery system to flow print agent through the detected recirculation device along the fluid passing direction.

5. The method according to claim 1, further comprising controlling a valve assembly to switch between the printhead circulation mode and the recirculation device circulation mode.

6. The method according to claim 1, further comprising:
- switching selection between the recirculation device circulation mode and the printhead circulation mode after a predetermined time.

7. A print agent delivery system for a printing system, the print agent delivery system comprising:
- an inlet for inputting print agent into the print agent delivery system;
- an outlet for outputting print agent from the print agent delivery system;
- a printhead to be on a printhead receiver of a printhead support of a printing system for delivering a print agent, the printhead comprising:
  - a print agent reservoir;
  - a first printhead port; and
  - a second printhead port in fluid communication with the first printhead port via the print agent reservoir;
- a recirculation device to be on a printhead receiver of the printhead support of printing system and connected in parallel with the printhead, the recirculation device comprising:

a first recirculation port;

a second recirculation port in fluid communication with the first recirculation port;

a check valve to allow fluid flow from the second recirculation port to the first recirculation port and to prevent fluid flow from the first recirculation port to the second recirculation port;

a first flow path to connect the first printhead port and the first recirculation port when the printhead and the recirculation device are in respective printhead receivers;

a second flow path to connect the second printhead port and the second recirculation port when the printhead and the recirculation device are in respective printhead receivers;

a valve assembly to selectively connect the inlet to the first flow path to allow print agent to flow through the printhead or to the second flow path to allow print agent to flow through the recirculation device.

8. The print agent delivery system according to claim 7, further comprising a controller to:

detect if a printhead and/or a recirculation device is on printhead receivers of the printhead support; and control the valve assembly to selectively connect the inlet to the first flow path or to the second flow path in function of the printheads and recirculation devices detected.

9. The print agent delivery system according to claim 7, wherein the check valve comprises an umbrella check valve.

10. The print agent delivery system according to claim 7, wherein the recirculation device comprises a housing to fit into the printhead receivers of the printhead support.

11. The print agent delivery system according to claim 7, wherein the printhead comprises a suction pressure generator to generate a suction pressure in the print agent reservoir of the printhead.

12. The print agent delivery system according to claim 7, further comprising an input flow path connected to the inlet;

an output flow path connected to the outlet;

an input branch flow path connecting the input flow path to the second flow path; and an output branch flow path connecting the first flow path to the output flow path.

13. The print agent delivery system according to claim 12, wherein the valve assembly comprises:

a first valve selectively connecting the input flow path to the first flow path;

a second valve selectively connecting the output flow path to the second flow path;

a third valve at the input branch flow path; and a fourth valve at the output branch flow path.

14. A non-transitory machine-readable storage medium encoded with instructions which, when executed by a processor, cause the processor to:

determine a printhead support configuration by identifying a recirculation device having a check valve and a printhead mounted on a printhead support of a printing system;

select a circulation mode based on the determined printhead support configuration;

control a valve assembly based on the selected circulation mode to activate a print agent flow path between an inlet and an outlet of a print agent delivery system through the printhead support, wherein the printhead and the recirculation device are located on the printhead support.

15. The non-transitory machine readable storage medium according to claim 14, when executed by a processor, cause the processor to:

select a recirculation device circulation mode if the recirculation device is identified to allow print agent flow through the recirculation device; and control the valve assembly to activate a print agent flow path between the inlet and the outlet of the print agent delivery system in a direction that the check valve allows fluid flow.

16. The non-transitory machine readable storage medium according to claim 14, when executed by a processor, cause the processor to:

select a printhead circulation mode when the printhead is identified;

generate a suction pressure in a print agent reservoir of the printhead;

control the valve assembly to activate the print agent flow path between the inlet and the outlet of a print agent delivery in a direction opposite to the direction that the check valve allows fluid flow.

* * * * *